(12) United States Patent
Jain et al.

(10) Patent No.: US 7,512,674 B1
(45) Date of Patent: Mar. 31, 2009

(54) FRAMEWORK FOR ENABLING DYNAMIC CONSTRUCTION OF A NETWORK ELEMENT MANAGEMENT MECHANISM

(75) Inventors: Chetan Jain, Milpitas, CA (US); Ying Wang, San Jose, CA (US); Abhishek Chaudhary, San Jose, CA (US); Rajagopalan Kannan, Campbell, CA (US); Tong Luo, Fremont, CA (US); Meera Sundaram, San Jose, CA (US); Jiang Zhu, Santa Clara, CA (US); Rajasekar Venkatesan, Saratoga, CA (US)

(73) Assignee: Ciena Corporation, Linthicum, MD (US)

( * ) Notice: Subject to any disclaimer, the term of this patent is extended or adjusted under 35 U.S.C. 154(b) by 946 days.

(21) Appl. No.: 10/603,995

(22) Filed: Jun. 26, 2003

Related U.S. Application Data

(60) Provisional application No. 60/392,674, filed on Jun. 28, 2002.

(51) Int. Cl.
*G06F 15/173* (2006.01)
(52) U.S. Cl. .......................................... 709/223; 709/224
(58) Field of Classification Search ................... None
See application file for complete search history.

(56) References Cited

U.S. PATENT DOCUMENTS

| | | | |
|---|---|---|---|
| 5,185,680 A * | 2/1993 | Kakubo | 360/72.2 |
| 5,483,631 A * | 1/1996 | Nagai et al. | 709/224 |
| 5,544,314 A * | 8/1996 | Fuchsreiter et al. | 709/224 |
| 5,822,569 A * | 10/1998 | McPartlan et al. | 703/21 |

OTHER PUBLICATIONS

"VINI: A virtual network infrastructure". http://www.vini-veritas.net. Accessed Jun. 18, 2007.*

Bavier, A. et al. "In VINI Veritas: realistic and controlled network experimentation." Computer Communication Review. vol. 36, No. 4, p. 3-14. ACM Press. Oct. 2006.*

Tsai, Ching-Wun et al. "SNMP through WWW." International Journal of Network Management. vol. 8, Issue 2. John Wiley and Sons. Mar. 1998. 104-19.*

Deri, Luca. "Desktop versus Web-based Network Management." International Journal of Network Management. vol. 9, Issue 6. Dec. 1999. John Wiley and Sons. 371-78.*

* cited by examiner

*Primary Examiner*—Jason Cardone
*Assistant Examiner*—Jeffrey R Swearingen
(74) *Attorney, Agent, or Firm*—Clements Bernard Miller; Christopher L. Bernard; Tyler S. Brown

(57) ABSTRACT

A framework is disclosed which enables a management system to manage completely different type of network elements (NEs) running different versions of their embedded software by introducing generic operational interfaces, generic data interfaces, information descriptors and self adaptive control mechanism. This Management system framework consists of mainly two parts a) core application and b) element-dependent components and c) a set of generic interfaces. When the management system is launched, it executes the core application. The core application comprises of network element independent version independent generic functionalities that can be used to interact with a variety of network elements and a dynamic control mechanism to make selection and placement of pluggable components at appropriate time and place during execution. After the core application is executed, whenever a need to manage one or more network elements, self adaptive control mechanism will take decision based on information descriptor of that target NE and NE type dependent version dependent modules are incorporated or "plugged in" with core application to produce an overall management mechanism to manage that target NE.

28 Claims, 10 Drawing Sheets

Element dependent modules

*NE type dependent &*

Version independent Modules:
- Connection manager
- Event Handler

NE type dependent &
Version dependent Modules:
    Information descriptors:
- NE descriptor
- Service descriptor
- MO descriptor
- Screen descriptor
- Operation descriptor Data presentation:
- Managed Object implementation (XXXMO class)

Operation support:
- Service proxy

Figure 3

FRAMEWORK FOR ENABLING DYNAMIC CONSTRUCTION OF A NETWORK ELEMENT MANAGEMENT MECHANISM

This application claims priority on provisional Application No. 60/392,674 filed on Jun. 28, 2002, the entire contents of which are hereby incorporated by reference.

FIELD OF THE INVENTION

The present invention relates generally to network management systems, and more particularly to a framework enabling management system to manage different type of network elements running different versions of their embedded software at run time.

BACKGROUND

In today's modern networks, it is quite common for network devices (also referred to as network elements or NEs) to be spread out over a wide geographical area. For example, one network element may be situated in New York, another in California, and another in Europe. Having network elements in such diverse geographical areas could result in the management of a network being difficult. To ease this managerial burden, many modern networks implement a remote management system. This management system, which could run from a computer connected to the network, enables a user to use the network to interact with and to remotely manage a plurality of network elements, regardless of where those elements are situated. With such a system, a user can manage an entire network conveniently and efficiently from a single centralized location if desired. This management system can be used to manage just a single network element or network of such network elements.

To enable a network element to be remotely managed, some additional functionality is imparted to the network element. This additional functionality is typically achieved through embedded management software. Specifically, the network element executes one or more programs that enable it to provide a set of management services. For example these services may include, support for functionality to monitor performance data, provision a connection or update one or more of the operational parameters of the network element to change the element's behavior etc. These services once available will be remotely invoked by the management mechanism (system) to achieve basic functionality as an element management system/network management system. Thus, by using the management mechanism to remotely invoke an element's management services, a user can remotely manage that element. Modern network management system usually supports OAM&P or FCAPS functionalities. OAM&P stands for Operations, Administration, maintenance and Provisioning. FCAPS stands for Fault Management, Configuration Management, Accounting Management, Performance Management and Security Management. Network management system provides necessary functionality for service providers to provision and maintain high levels of service.

In order to invoke the management services offered by a network element, the management mechanism needs to have information regarding what services are offered and how to invoke those services. Typically, the management mechanism executes one management program per network element specific to that network element with a specific release of software in order to manage it. The management program is hard-coded such that it has information regarding what services are offered by the network element, and how those services can be used. As noted above, the management mechanism gains the ability to remotely manage the network element. The management program is specific to a particular network element. Thus, to manage another network element, the management mechanism may need to execute another management program. Another typical approach is to write a wrapper application, which appears to be a single management system, but underneath the system there are separate applications for each type of network element and each major software version of the network element.

But a modern network may comprise many different types of network elements from different manufacturers and it may contain different versions of the same type of network elements within a network as well. For example, network elements may include optical cross connect, switches, routers, bridges, gateways, etc. Each type of element may perform different functions, have different releases of an operating system and hence, may have different aspects that need to be distinctly managed. As a result, each type of element may offer different remote management services. Even for the same type of element, the remote management services offered may differ from element to element. For example, different versions of an element's embedded system software (or operating system) may have different functionalities (e.g. a newer version of a router's embedded system software may have more functionality than a previous version of the same switch). Hence, the different versions of the element's embedded system software may offer different services to manage the different functionalities. Even where the same management services are offered, the manner in which the services are implemented may differ from one version of an element's embedded system software to another. For example, in a first version of a switch's embedded system software, a management service may use a particular data type, whereas in a second version of a switch's embedded system software, the same management service may use a different data type. As this discussion shows, there can be great variation in network element characteristics (e.g. element type, version, services offered etc.) across the various elements in a network.

As noted above, the management mechanism executes a management program specific to a particular version of the network element's embedded system software in order to remotely manage that element. If two network elements have identical characteristics from a remote management standpoint, then the management mechanism can execute the same management program to manage both elements. However, if any of the characteristics of the elements are different (for example, the elements are of different types (e.g., different product types), the versions of the elements' embedded system software are different, etc.), then the management mechanism will need to execute different programs within a management system to manage the different elements. As discussed previously, a network may comprise many elements with different characteristics. As a result, to manage all of the elements in a network, the management mechanism may need to execute a large number of different management programs. This imposes a heavy burden on the management mechanism in many respects, including heavy storage consumption (a complete copy of each management program needs to be stored), heavy memory usage (if a large number of the management programs are run concurrently and system memory can be quickly and completely consumed). These all contribute to degrading the performance of the management system and scalability become an issue. And for a large number of managed NEs, the system becomes very slow and practically useless.

The other significant drawback of the current approach is that development of management software is very tightly coupled with a specific type of NE and maintenance of such a system becomes increasingly difficult as more types of NEs and different versions of its embedded system software needs to be managed. Also development complexities increase since developers cannot work independently without knowing both the NE and the management system software. Any addition or modification of services to the NE will likely result in a need for a modification to the software. Also work of one developer will directly interfere with the change made by another and the management of the code base for the software becomes a fairly complex task directly resulting in exponentially increasing development time for small incremental changes to the system. Not only do modified services need to be tested, but existing functionalities also need to be re-tested to ensure the quality of the system. Therefore, this approach results in longer time to market as well as more development resources In order to manage multiple NEs of either different types or different software versions, multiple such management systems need to be fully installed in order to manage those NEs and to ensure that the backward compatibility support, which is becoming increasingly important with centralized network management systems is also addressed.

An old alternative approach is to have a very thin wrapper layer which uses large and heavy NE specific programs to manage multiple NEs of different types and/or different versions. However, the draw back mentioned above also applies to this approach as well. Based on the foregoing, it is clear that the current methodology for remotely managing network elements has significant drawbacks. As a result, an improved approach is needed.

BRIEF DESCRIPTION OF THE DRAWINGS

The embodiments of the present invention will become more fully understood from the detailed description given herein below and the accompanying drawings which are given by way of illustration only, and thus are not limitative of the present invention, and wherein:

FIG. 3 shows a list of modules included in a set of element-dependent modules in accordance with one embodiment of the present invention.

DETAILED DESCRIPTION OF EMBODIMENT(S)

Overview

Figure 1:
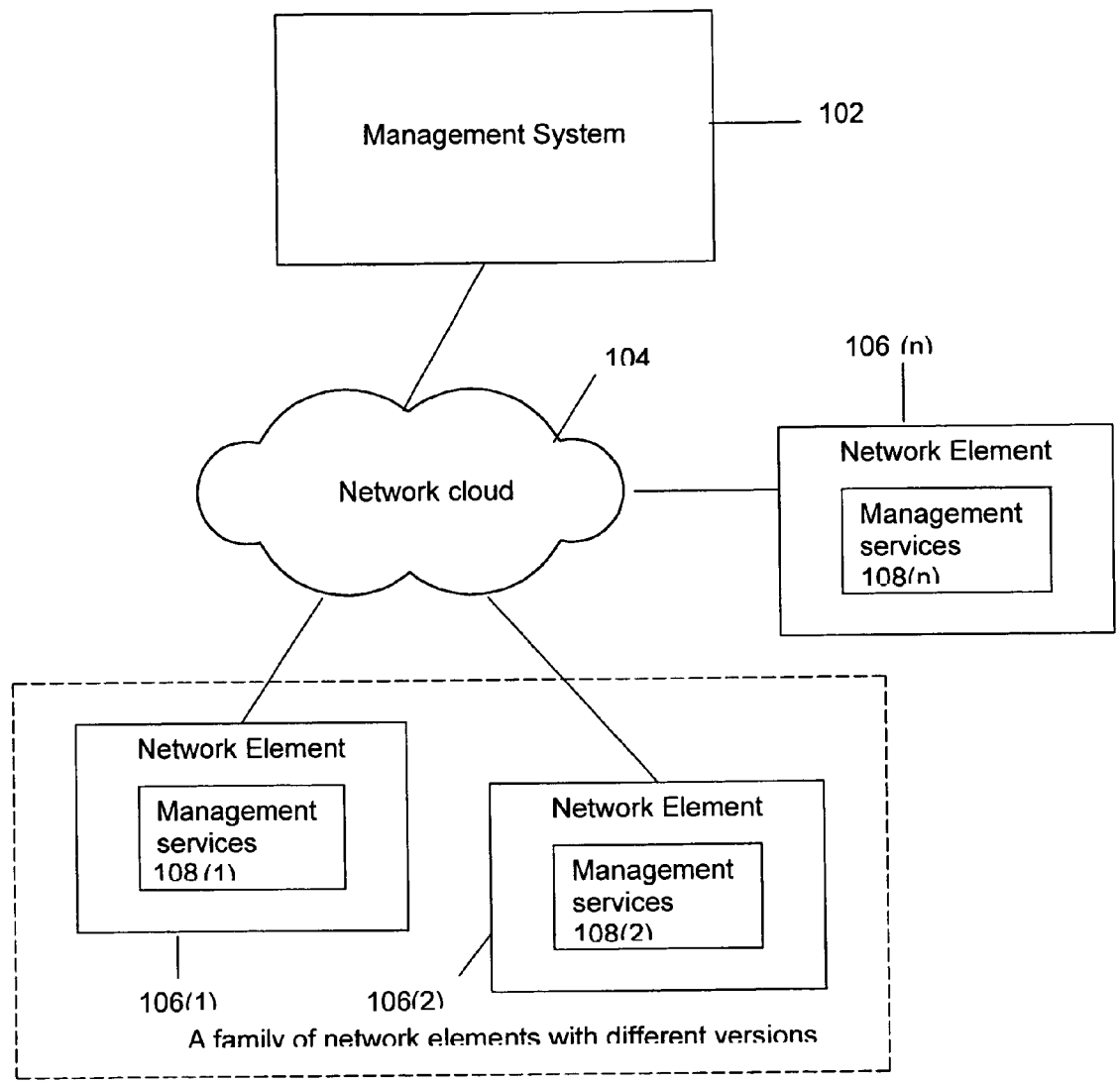
FIG. 1 is a functional diagram of a network system in which one embodiment of the present invention may be implemented.

With reference to FIG. 1, there is shown a functional diagram of a system 100 in which one embodiment of the present invention may be implemented. As shown, system 100 comprises a network 104, a plurality of network devices or elements 106 coupled to the network 104, and a management mechanism (system) 102, also coupled to the network 104, for managing the various network elements (NEs) 106. For the sake of simplicity, only one management mechanism 102 is shown; however, it should be noted that any desired number of management mechanisms 102 might be implemented in system 100 within the scope of the present invention.

For purposes of the present invention, network 104 may be any type of network, including, but not limited to, a local area network, a wide area network, such as a metropolitan network, core network, the Internet, or a combination thereof. Any component or components capable of communicatively coupling the network elements 106 and management mechanism 102 may serve as network 104 and also may encompass the network elements.

Network elements 106 represent different types of devices or the same type of devices with different versions of embedded software. For example, a network element 106 may be a optical switch, a router, a bridge, a gateway, or any other type of device that can be coupled to or included within network 104. In addition to varying by type, network elements 106 may also vary by version. For example, system 100 may comprise multiple versions of the switch or router. The general functionality of the routers may be the same, but the specific capabilities of each router may differ depending upon the version of the router (e.g. a newer version of a router's embedded system software may have a capability that an older version does not have). Type and version are just two of the many characteristics that can vary from network element 106 to network element 106. There may be many other varying characteristics as well including different hardware components, line modules, switching modules, etc.

Network elements 106 may be situated in diverse geographical areas (e.g. element 106(1) may be in California and element 106(n) may be in Europe). This fact can make managing the elements 106 difficult. To ease this managerial burden, the elements 106 provide management services 108 that can be invoked remotely by management mechanism 102 to manage various operational aspects of the elements 106. In one embodiment, the elements 106 implement the management services 108 in software. That is, one or more processors on each element 106 execute one or more programs to provide the functionality of the management services 108. These management services 108 may be remotely invoked by management mechanism 102 using any known remote invocation mechanism including, but not limited to, HTTP, SNMP, TCP/IP, CORBA, RPC, JAVA RMI, etc. Services on different elements 106 may be invoked using different remote invocation mechanisms. For example, the services 108(1) on element 106(1) may be invoked using CORBA, while the services 108(n) on element 106(n) may be invoked using JAVA RMI.

When invoked, the management services 108 of an element 106 can add, delete, and/or update certain operational parameters of the element 106 which affect the operational behavior of the element 106. Thus, by invoking the management services 108, the management mechanism 102 can remotely manage or control the behavior of the network elements 106. As noted above, the network elements 106 can have widely different characteristics (e.g. different type, version, etc.), and hence, can have widely different functionalities. Thus, different network elements 106 can offer different management services 108 to manage the different functionalities.

In order to invoke the management services 108 provided by the network elements 106, the management system 102 typically not only needs to know what services 108 are provided by each element 106 and how to invoke those services 108, but also the exact format for data transfer, the specific structure of the data and the specific operational sequence. Previously, the management mechanism 108 acquired this knowledge by executing a specific monolithic management program for each different element 106. As discussed above, this approach has significant drawbacks.

Figure 2:
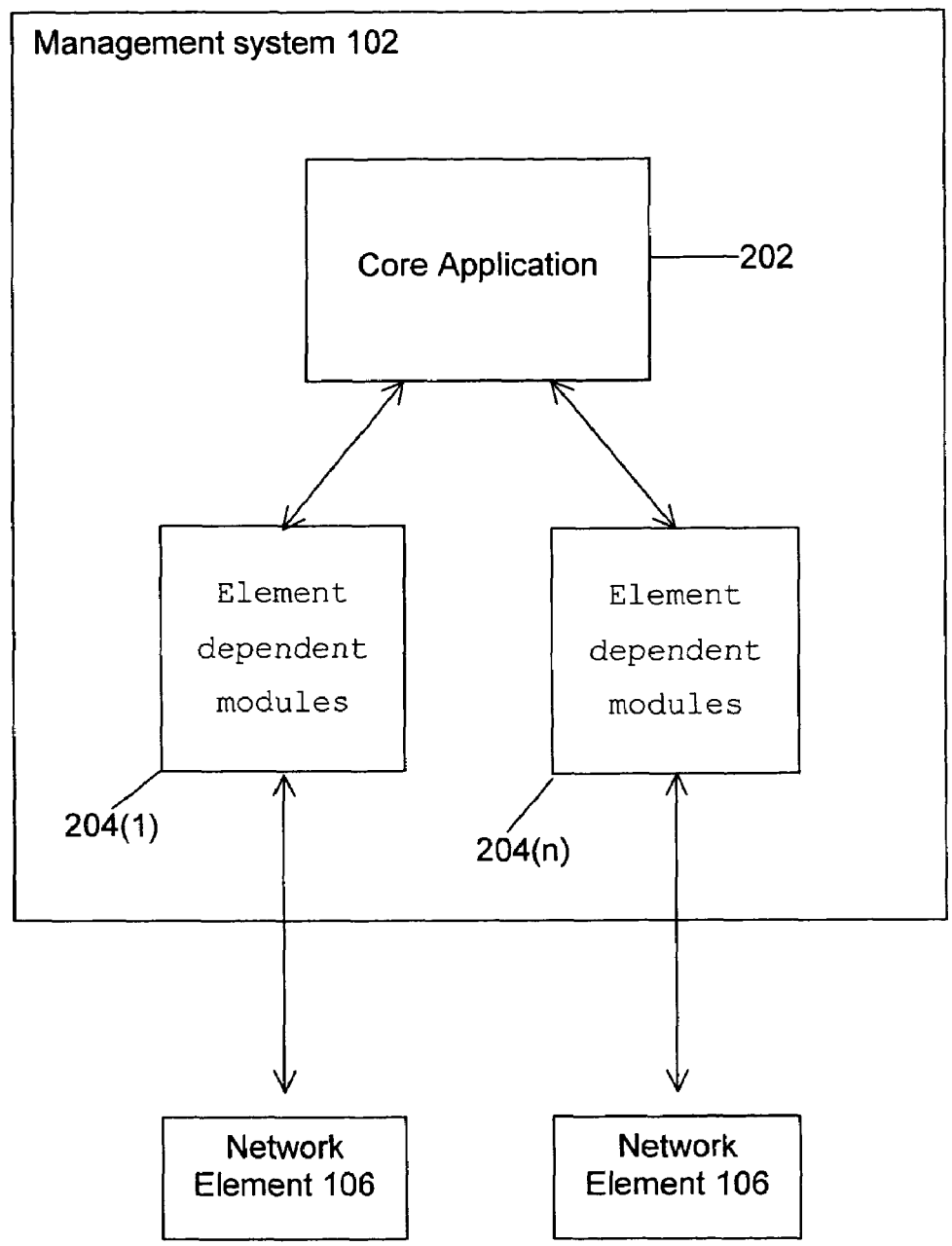
FIG. 2 is a functional diagram of the management system of FIG. 1 in accordance with one embodiment of the present invention.
Figure 10:
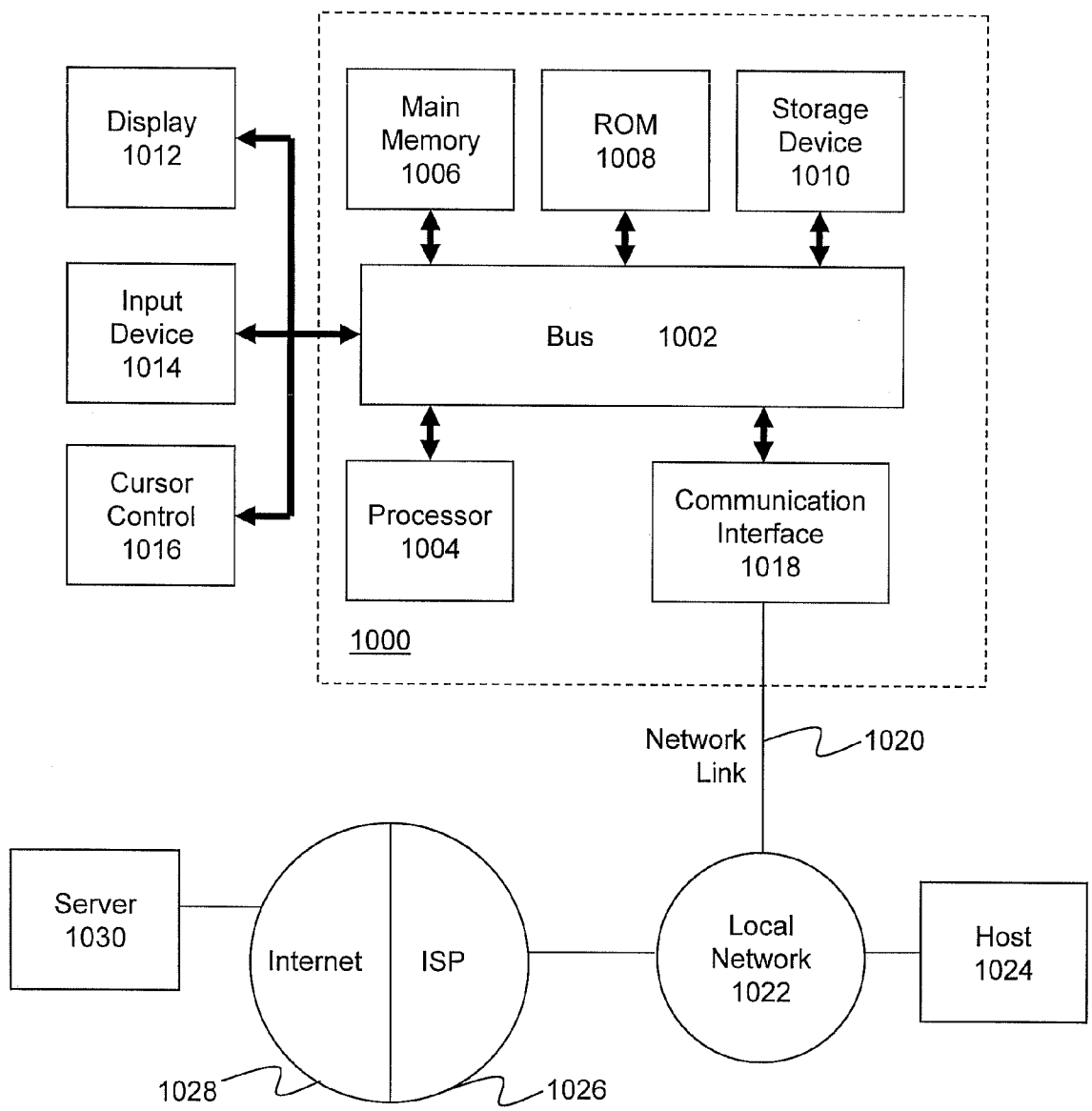
FIG. 10 is a hardware block diagram of a general-purpose computer system in which one embodiment of the management mechanism may be implemented.

In accordance with one embodiment of the present invention, there is provided a different and improved approach. This approach is illustrated in the functional block diagram of FIG. 2. Specifically, rather than executing a plurality of monolithic management programs to manage a plurality of different elements 106 (e.g., with different embedded system software), the management mechanism 102 (which in one embodiment takes the form of a general purpose computer) executes a core application 202 and incorporates one or more sets of element specific modules 204 therewith. The core application can be run on one or more processors. One such processor (processor 1004) is shown in FIG. 10.

The core application 202 provides general functionality that can be used to interact with all network elements 106. For example, core application 202 may comprise a user interface engine, a mechanism for generically invoking a service, a managed object manager to manage generic data type and logic for dynamically creating and incorporating one or more sets of element-dependent modules 204 with the core application 202. The reference to an element-dependent module can include both an network element ("NE") dependent module and/or a version dependent module. In one embodiment, the core application 202 contains no code that is specific to any network element 106; thus, core application 202 is network element independent and its operating software version independent.

The element-dependent modules 204 provide the element-dependent information that the management mechanism 102 needs in order to interact with the various network elements 106. In one embodiment, there may be a set of element-dependent modules 204 associated with each element 106 having different characteristics. For example, there may be a set of modules 204 for version 1 of a switch's embedded system software, a different set of modules 204 for version 2 of a switch's embedded system software, a different set of modules 204 for version 1 of a router's embedded system software, etc.

The set of modules 204 associated with an element 106 provides all of the element-dependent information needed to interact with that element 106. In effect, the element-dependent modules 204 act as intermediaries between the core application 202 and the element 106 to enable the core application 202 to invoke the specific services 108 provided by the network element 106. Functions performed by the element-dependent modules 204 may include, for example: (1) transforming a generic service invocation from the core application 202 into an invocation of a specific service 108 provided by the network element 106; and (2) transforming the raw data received from the network element 106 into a generic data type that the core application 202 can process and render and vice versa.

The element-dependent modules 204 may be dynamically incorporated with or "plugged in" to the core application 202 as needed. For example, suppose that a user desires to use management mechanism 102 to manage element 106(1), and that element-dependent modules 204(1) are associated with element 106(1). In such a case, core application 202 accesses modules 204(1), and dynamically incorporates them with the core application 202. Once that is done, the management mechanism 102 may be used to invoke the management services 108(1) of element 106(1) to manage the operation of the element 106(1).

Suppose further that a user also desires to use management mechanism 102 to manage element 106(n), and that element-dependent modules 204(n) are associated with element 106(n). In such a case, core application 202 accesses modules 204(n), and dynamically incorporates them with the core application 202. Thereafter, management mechanism 102 may be used to manage element 106(n) as well. In one embodiment, any number of sets of element-dependent modules 204 may be incorporated with core application 202; thus, with one core application 202 and a plurality of sets of element-dependent modules 204, a management mechanism 102 may be dynamically constructed that is capable of managing a plurality of different network elements 106 with different characteristics. By dynamically constructing a management mechanism 102 in this manner, it is no longer necessary to store and to execute a different monolithic program for each different network element 106. By eliminating this need, storage consumption, and memory usage are significantly reduced.

With the proposed approach, one can work independently without knowing details of implementation of management system framework (Core components) and provide NE dependent pluggable components. These functionality rich core components can be tested separately. The testing effort required for any modifications to services is limited only to NE dependent pluggable components Such management system can be developed with less time and effort and easy to maintain its life cycle.

Element-Dependent Modules

FIG. 3 shows one such set of element-dependent modules 204 in greater detail. More specifically, FIG. 3 depicts a list of modules that may be included in a set of element-dependent modules 204, in accordance with one embodiment of the present invention. As used herein, the term "module" refers broadly to any structure that contains data or code. For example, a module may be an object class, or a file or other data structure that contains data or information.

NE Type Dependent Version Independent Modules

Connection Manager

A set of NE-dependent modules 204, each includes a connection manager. Each connection manager can be shared for a group of NEs supporting the same communication channel. In one embodiment, the connection manager is responsible for enabling communication between the management mechanism 202 and the network element 106 that is to be managed. For example, the connection manager creates and maintains a connection between the management mechanism 202 and the element 106. In addition, the connection manager ensures that the proper invocation mechanism (e.g. JAVA RMI, RPC, etc.) is used to invoke the services 108 of the element 106. As noted previously, different elements 106 may use different invocation mechanisms. Thus, which connection manager is included in a set of modules 204 depends upon the element 106 with which the set of modules 204 is associated. The Proxy layer will convert generic data for any connection calls like logon into version dependent call Event Handler The Event Handler is used if NE supports autonomous messaging. An autonomous message is referred to as an "event" in this document. Different NE types or different versions of the same NE type can supply different formats of autonomous messages. Those different formats of messages will be converted to generic data types in the proxy layer and processed further by the Event Handler. Based on different NE types, different processing policies will be executed for event handling. Event Handler may be shared among multiple NEs as long as they support autonomous messaging in the same manner.

NE Type Dependent Version Dependent Modules

Element Descriptor

As shown in FIG. 3, a set of element-dependent modules 204 comprises an element descriptor. As noted above, each set of element-dependent modules 204 is associated with a particular network element 106 having certain characteristics. That being the case, the element descriptor provides some basic information pertaining to that element 106. Among other information, the element descriptor, in one embodiment, comprises an indication of the type of element 106 (e.g. whether the element is a router, switch, etc. and the version of the embedded system software of the element; this indication may take the form of a model number, for example). The element descriptor may also comprise an indication of the version of the element 106 (for example, the version number of the management services software 108 that is running on the element 106). The element descriptor may further comprise indications of other characteristics of the element 106. As will be described in greater detail in a later section, the core application 202, in one embodiment, uses the information in the element descriptor to determine what modules to incorporate with the core application 202 to manage an element 106.

Service Descriptors

A set of element-dependent modules 204 also comprises one or more service descriptors. In one embodiment, there is a service descriptor for each management service 108 offered by an element 106. Among other information, a service descriptor, in one embodiment, comprises the name of a service, and a list of the object classes that are managed by that service. For example, if the service is a protocol, such as OSRP (optical signaling and routing protocol), which is similar to the PNNI (Private Network to Node Interface) protocol, the managed object classes may be "Node" and "Link". This means that in managing the OSRP service, a user may add/delete/modify Node and Link objects. Basically, the service descriptors provide information as to what management services 108 are offered by an element 106, and what object classes can be managed using those services.

Proxies

A set of element-dependent modules 204 also comprises one or more proxies. In one embodiment, there is a proxy for each management service 108 offered by an element 106. For example, if an element 106 provides services X and Y, then there will be a proxy X, which corresponds to service X, and a proxy Y, which corresponds to service Y. Each proxy is coded such that it has specific knowledge as to how to invoke the specific management service 108 with which it corresponds. In one embodiment, it is the responsibility of a proxy to receive a generic service invocation from the core application 202, and to transform that generic invocation into a specific service or function invocation having the proper format expected by the element 106. It is also the responsibility of the proxy to transform a generic data type used by the core application 202 in its generic service invocation into the raw data type expected by the element 106. In order to complete this task, proxy may make use of operational descriptor. Basically, a proxy shields the element-dependent aspects of a service invocation from the core application 202. By doing so, the proxy enables the core application 202 to remain generic.

Managed Object Classes

Managed object class not only encapsulates raw data of different types (structure, property, XML etc.) from different elements of different versions, but also presents data in a generic way to core application even if the data are vastly different as they can be from different services of a network element. As noted above, each management service 108 manages one or more managed object classes. In one embodiment, each of these managed object classes is included in the set of element-dependent modules 204. Each managed object class may have one or more attributes, and may implement one or more methods.

Raw data may be passed between a proxy and a management service 108 when the proxy invokes that service 108. A managed object instance encapsulates raw data received from the service 108. In one embodiment, a managed object class comprises functionality that enables it to transform the raw data into a generic data type that is understood by the core application 202. That way, the core application 202 does not need to know how to process any of the raw data types, which can be of different types, stringbuffer, IDL struct, XML or property, which enables it to remain generic. Also, a managed object class comprises functionality that enables it to transform data in the generic data type into raw data expected by a management service 108. As will be discussed further in a later section, a proxy invokes this functionality when the proxy transforms a generic service invocation from the core application 202 into a specific function or method invocation that is sent to a management service 108.

Managed Object Descriptors

A set of element-dependent modules also comprises one or more managed object descriptors. In one embodiment, there is a managed object descriptor associated with each managed object class. Among other information, a managed object descriptor specifies what attributes are supported by its corresponding managed object class, and the data types of those attributes. It can also contain other information like the range of values for attributes.

User Interface (UI) Screens: UI Screens are Dynamically Created Using Information Provided by Managed Object Descriptor and Screen Descriptors.

These screens are rendered by the core application 202 to provide an interface to a user. In one embodiment, each service may have one or more associated screens, and each managed object class may have one or more associated screens. A screen may have any type of UI component, such as buttons, text, fields, etc. Depending upon the service or managed object class that a user selects, the core application 202 will render the appropriate screen or screens.

Screen Descriptors

As noted above, a screen may contain fields that are filled in with data. This data may be data from one or more of the managed object instances. Also, construction of a screen depends upon information regarding which widgets and fields are going to be present in the screen at a given point in time based on different values of data combination as well as user selection. Screen descriptor contains information of the UI fields and widgets. In order to know what data to place in which fields, the core application 202 needs a field-to-data mapping. A screen descriptor provides this mapping too. Also, certain widgets on a screen may be associated with particular managed object classes. The screen descriptor also provides this widget-to-managed object class mapping. The core application 202 uses this mapping to render a screen, and to accept and interpret commands from a user. In one embodiment, there is one screen descriptor associated with each screen, and these screen descriptors are included in the element-dependent modules. The screen descriptor also contains information about special operations that should be invoked when the user interacts with the UI (like clicking a button).

Operation (Invocation) Descriptor

Some network elements 106 may implement specialized invocations within a given service that need to be invoked through a generic invocation of the proxies. For such specialized invocations, there is a description of the operation service in an operation descriptor. Use of this operation descriptor will be discussed in a later section.

Common Interfaces

To enable the core application 202 to remain network element independent and version independent, it is desirable to keep the core application 202 as generic as possible. Furthermore, it is desirable to isolate all of the element-dependent aspects of the management mechanism 102 in the element-dependent modules 204. To do so, in one embodiment, several common generic interfaces 504 are established. Core application 202 communicates with element dependent modules through generic interfaces 504. These interfaces 504 define the methods that certain types of modules will implement. Each module may provide a different implementation for each method, but the methods that are implemented remain the same. The core application 202 communicates with the modules via these common or generic interfaces 504. Because the interfaces 504 are common across all modules of a certain type, the core application 202 is guaranteed that if it invokes one of the methods on a particular module, that module will have an implementation for that method. In one embodiment, at least two common interfaces are implemented: a ProxyIf interface that is implemented by each of the proxies; and a ManagedObjectInterface interface that is implemented by each of the managed object classes.

ProxyIf

The ProxyIf interface includes a number of generic methods. In one embodiment, these methods include:
AddObject/s;
ModifyObject/s;
DeleteObject/s;
GetObject/s; and
GetObjectAttributes
invokeOperation.

These methods are invoked by the core application 202 to manage a managed object instance of a particular service. Specifically, addObject is invoked to add a managed object instance to a service (e.g. to add a "link" object to the OSRP service). ModifyObject is invoked to modify an existing managed object instance. DeleteObject is invoked to delete an existing link between two network elements GetObject is invoked to obtain an existing list of links from the managed network element to rest of the network. When invoking these methods, the core application 202, in one embodiment, provides an identifier or reference for the managed object instance that is to be the subject of the method. In most instances, these object management methods are sufficient to carry out all element management functions.

In some special instances, however, the operation that needs to be performed does not fall within one of the object management methods. For such special circumstances, the ProxyIf interface provides the invokeOperation method. This method is invoked when a special operation not covered by the standard object management methods needs to be invoked. When invoking the invokeOperation method, the core application 202, in one embodiment, provides not just an identifier for the managed object instance that is to be the subject of the special operation, but also the name of the special operation. The core application 202 obtains specific information pertaining to the special operation from the operation descriptor discussed above.

In accordance with one embodiment of the present invention, each proxy provides an implementation for each of the methods in the ProxyIf. Since each proxy is element-dependent and service-specific, each proxy may and most likely will implement each method differently. To illustrate how the core application 202 can use the ProxyIf interface to manage a managed object instance, reference will be made to an example (see FIG. 4).

Suppose that a user wishes to use the OSRP service 402 of an element 106 to delete an existing link object instance from that element 106. The user communicates this desire to the core application 202 via a user interface provided by the core application 202. In response, the core application 202 invokes the deleteObject method of the proxy associated with the OSRP service (assuming that there is a proxy associated with each service for this network element. There can be a single proxy for all the services of a given network element. This relationship depends up on behavior of a particular network element and its given version.). In this invocation, the core application 202 provides the identifier of the link object that is to be deleted. This method invocation causes the implementation of the deleteObject method provided by the proxy to be executed. In this case, because this proxy is associated with the OSRP service, the implementation for the deleteObject method is coded with specific knowledge of how to access the OSRP service 402 on the element 106 to delete a managed object instance. More specifically, the implementation knows which specific function to call, in what format the call should be made, what parameters need to be provided with the call, etc. Thus, the implementation transforms the generic deleteObject method invocation received from the core application 202 into a specific function call that is sent to the OSRP service 502 of the element 106. In this manner, the proper service 502 on the element 106 is invoked to delete the managed object.

Notice in this operation that the core application 202 does not know any of the specifics of the OSRP service 502. It simply makes a call to a generic method of an appropriate proxy. After that, it is the proxy that implements the details of the actual invocation of the OSRP service 502 on the element 106. Thus, by establishing a common ProxyIf interface, and by having each proxy implement the interface, it is possible to shield the core application 202 from the specific details of the service invocation process. As a result, the core application 202 can remain generic and element independent.

MoIf

The MoIf interface is implemented by each of the managed object classes. Each managed object class may provide a different implementation for each of the methods of the MoIf interface. In one embodiment, the MoIf interface comprises the following methods:

getAttribute;
SetAttribute;
modifyAttribute; and
dataConvert.

The getAttribute method is invoked by the core application 202 when the core application 202 needs the value of a particular attribute of a managed object instance. The modifyAttribute method is invoked by the core application 202 when the core application 202 wishes to change the current value of an attribute.

In one embodiment, attributes values are stored within a managed object instance in a generic format (e.g. one such way of storing data can be as a set of key, value pairs). This generic format may not be what is used by a service 108 when it manipulates a managed object. Thus, it may be necessary to convert the attribute values from the generic format to the raw data format (e.g. XML) that the service 108 expects. To do so, the dataConvert method is invoked. In one embodiment, the proxy associated with the managed object class invokes this method. Since each managed object is element-dependent and service-specific, the implementation provided by a managed object class for the dataConvert method will know what raw data format is expected by the service, and will contain logic for transforming the generic data format into that raw data format.

An additional method that is implemented by each managed object class, but which is not necessarily a part of the MoIf interface is the init method. When a managed object instance is created by its associated proxy, the managed object instance receives raw data from the proxy, which represents the attribute values of the managed object instance. As noted above, the attribute values are, in one embodiment, stored in the managed object instance in a generic data format. Thus, before the attribute values can be stored, they need to be converted into the generic data format. The function of the init method is to carry out this conversion. In one embodiment, the proxy invokes the init method to initialize a newly created managed object instance.

Core Application

Figure 4:
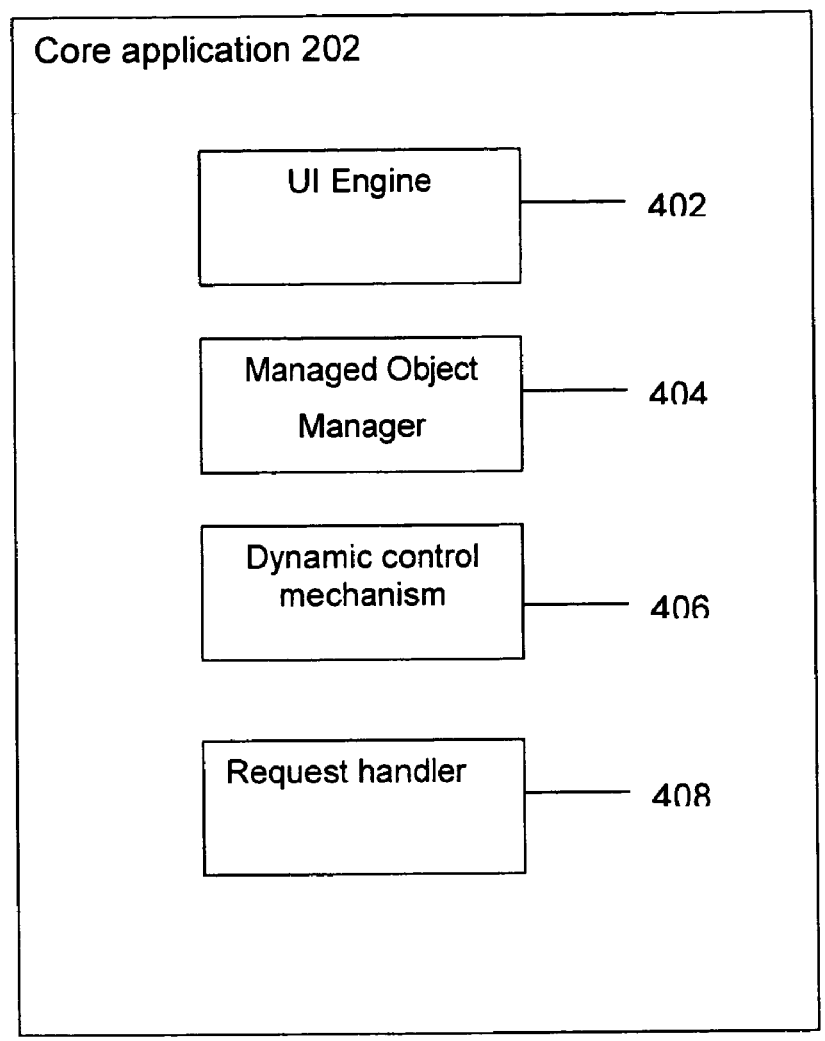
FIG. 4 is a functional diagram of a core application in accordance with one embodiment of the present invention.
Figure 5:
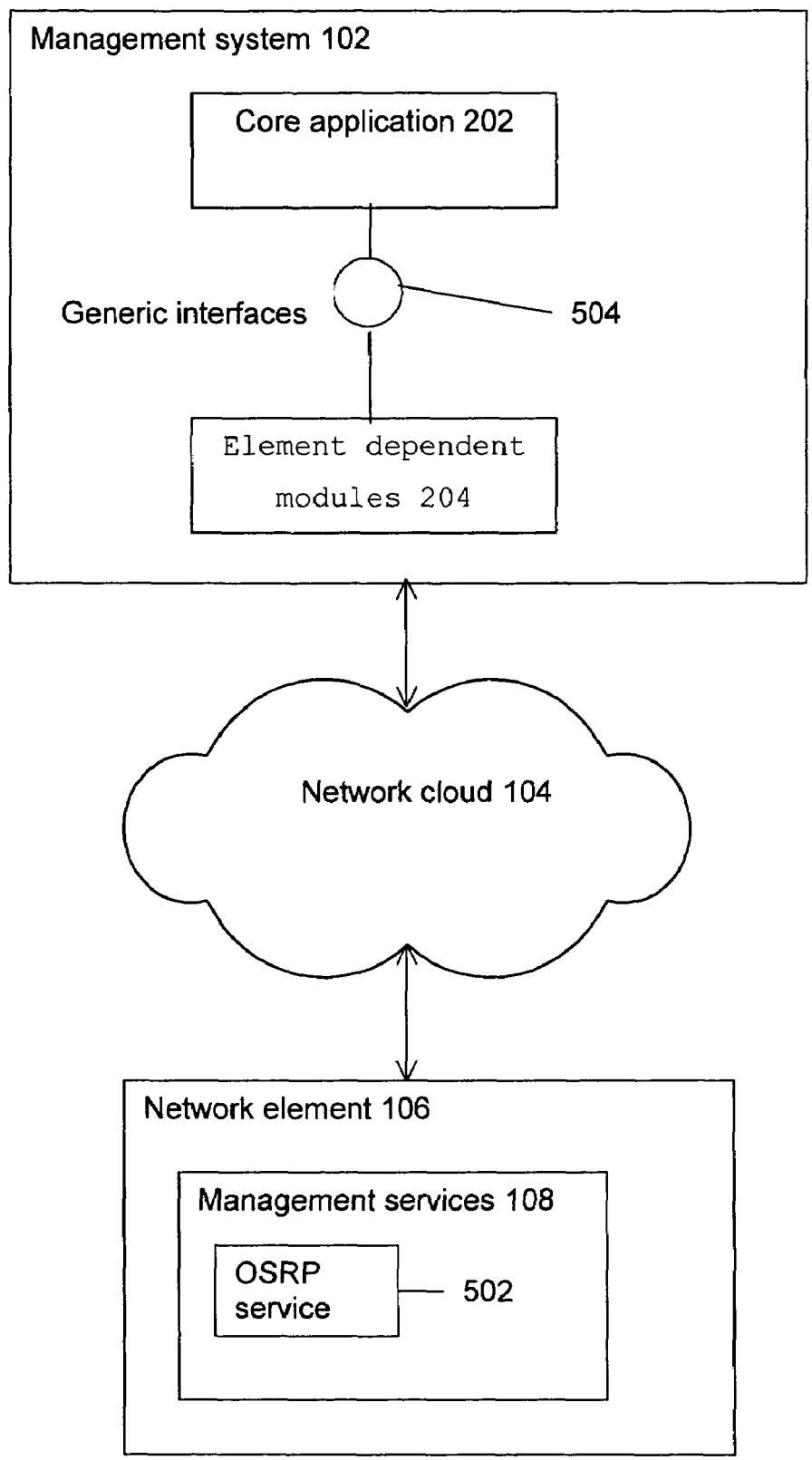
FIG. 5 is a functional diagram illustrating how a proxy with a common interface may be used to invoke a service provided by a network element in accordance with one embodiment of the present invention.

The core application 202 provides generic functionality that can be used to interact with all network elements 106. In one embodiment, as shown in FIG. 4, the core application 202 comprises a user interface (UI) engine 402, a Request Handler 408, a Managed Object Manager class (supporting various type of query mechanism including aggregation on data and transaction processing for operations) 404, a dynamic control mechanism (DCM) 406 responsible for making selection and placement of pluggable components.

The UI engine 402 is responsible for rendering screens to users, and for accepting input from users. In performing its function, the UI engine 402 uses the screen descriptors provided as part of a set of element-dependent modules 204. Since the UI engine 402 renders screens that are provided as part of a set of element-dependent modules 204, the UI engine 402 need not have any specific knowledge of any particular element 106; hence, the UI engine 402 can remain generic.

The request handler 408 is responsible for propagating user request passed from UI engine 402 to appropriate component for further processing. For example, if user asks for filtered data from local caching component, the request handler will propagate the request to Managed Object Manager 404 and provide the filtered set of data. The Managed Object Manager class 404 manage a single type of managed object that NE support. In one embodiment, the Managed Object Manager class 404, like a proxy, implements the generic interface. n its implementation of the ProxyIf interface, the Managed Object Manager 404 class performs a coordination and caching function. It is capable of in memory management of data or interfacing separately with a full-blown database application to manage its data storage needs local to management mechanism. More specifically, for certain service invocations, such as "get" operations, the Managed Object Manager class 404 first determines whether it has the information that is being sought. If so, the Managed Object Manager class 404 provides that information to the UI engine 402. If not, the Managed Object Manager 404 forwards the service invocation to a proxy to get that information from the management service 108 of a network element 106. In one embodiment, there is one Managed Object Manager class 404. At dynamic construction time, this class 404 is instantiated once for each managed object class. Thus, there is a one-to-one correspondence between a Managed Object Manager instance and a managed object class. This will be discussed in greater detail in a later section.

The dynamic construction mechanism (DCM) 406 is the component that coordinates and manages the process of incorporating (creating and plugging in) sets of element-dependent modules 204 with the core application 202, thus constructing a fully functional management mechanism. Under direction of the DCM 406, one or more sets of element-dependent modules 204 may be incorporated with the core application 202 to dynamically construct an overall management mechanism 102 that is capable of managing a plurality of different network elements 106.

Dynamic Construction

To illustrate how a management mechanism 102 may be dynamically constructed, reference will be made to the flow diagram of FIG. 6, which illustrates the operational flow in accordance with one embodiment of the present invention. To facilitate a complete understanding of the invention, the dynamic construction process will be described with reference to an example. In this example, it will be assumed that the element to be managed is element 106(1) (see FIG. 1), that the element 106(1) provides one service (OSRP), and that this service manages two managed object classes (Node and Link).

In one embodiment, the management mechanism 102 takes the form of a general-purpose computer executing one or more sets of code. By "dynamically constructing a management mechanism", it is meant that the computer executes and incorporates various sets of code to give itself the ability to act as a management mechanism.

With management mechanism application launched by user, the dynamic construction process begins and the computer loads and executes (604) the core application 202 first. Specifically, the computer loads the UI engine 402 and executes the DCM 406. Under direction of the DCM 406, the computer continues the dynamic construction process.

To continue the process, the DCM 406 receives (608) an indication of a particular network element 106(1) to be managed. In one embodiment, this indication takes the form of an instruction to manage a particular network element 106(1). This instruction may be received from a user, received from another component (e.g. another computer), read from a file, etc. In one embodiment, this instruction includes a reference (e.g. an IP address) to that element 106(1). In one embodiment, this also includes the Type of the Network Element. The DCM 406 uses this reference to contact the element 106(1) to obtain (612) an element descriptor there from. Some elements 106 may be able to provide an element descriptor; some may not. If the element 106(1) is not able to provide the element descriptor, then the DCM 406 may need to obtain the element descriptor from local storage, or obtain the element descriptor information from the user. However the element descriptor is obtained, once the DCM 406 has it, the DCM 406 is able to ascertain the characteristics of the element 106(1) (for example, the type and version of the element).

Based upon the information in the element descriptor, the DCM 406 accesses (610) a set of element-dependent modules 204 associated with the element 106(1). The set of element-dependent modules 204 may be accessed from local storage, from another component (e.g. another computer or element on the network), or from the element 106(1) itself. In one embodiment, the DCM 406 uses the type and version information from the element descriptor to access a directory in local storage that contains the set of element-dependent modules 204 for the element 106(1). These modules may include a connection manager, service descriptors, proxies, managed object classes, managed object descriptors, screen descriptors, and operational descriptor (if any).

After the set of element-dependent modules 204 is accessed, the modules are dynamically incorporated (612) with or plugged into the core application 202. In one embodiment, the incorporation process is carried out as follows. Initially, the DCM 406 obtains the connection manager. Then, the DCM 406 instantiates the connection manager and incorporates it with the core application 202. The connection manager may thereafter be used to communicate with the OSRP service of the element 106(1).

The DCM 406 also obtains the services descriptors for the element 106(1). As noted above, there is one service descriptor for each service provided by the element 106(1), and each service descriptor specifies the managed object classes that are managed by the service. In this example, the element 106(1) offers one service (OSRP); thus, there is one service descriptor. This service descriptor specifies that this service manages two managed object classes, called Node and Link.

Based on the service descriptor, the DCM 406 starts or instantiates one or more Managed Object Managers. In one embodiment, the DCM 406 instantiates one Managed Object Manager for each managed object class. In this example, there are two managed object classes, Node and Link. Thus, the DCM 406 instantiates two Managed Object Managers. As each Managed Object Manager is instantiated, it is initialized with information indicating the type of managed object with which it is associated. Thus, in this example, one Managed Object Manager is initialized to indicate that is it associated with the Node managed object class, and the other Managed Object Manager is initialized to indicate that it is associated with the Link managed object class.

After the Managed Object Managers are instantiated, the DCM 406 further obtains the proxies for the services. In this example, there is only one service (e.g., OSRP); thus, there is only one proxy. This proxy provides an implementation for the ProxyIf interface that is tailored for the OSRP service. Upon obtaining the proxy, the DCM 406 instantiates the proxy, and incorporates it with the core application 202. In addition, the DCM 406 instantiates lookup service, which provides link between each of the Managed Object Managers and proxy, based on service and managed object supported by that service. That way, if the Managed Object Managers need to invoke the OSRP service of the element 106(1), the Managed Object Managers will know which proxy to invoke. When the proxy is incorporated with the core application 202, the proxy requests from the connection manager a connection to the OSRP service of the element 106(1). Once that connection is established, the proxy can use it to communicate with the OSRP service.

Thereafter, the DCM 406 obtains the remainder of the element-dependent modules, which includes the UI screens, the screen descriptors, the managed object descriptors, and the operation descriptor (if any). These modules are loaded and incorporated with the core application 202. The management mechanism 102 is thus dynamically constructed. (managed object classes are generated only when data is transferred between NE (network element) and MM (management mechanism)

Figure 7:
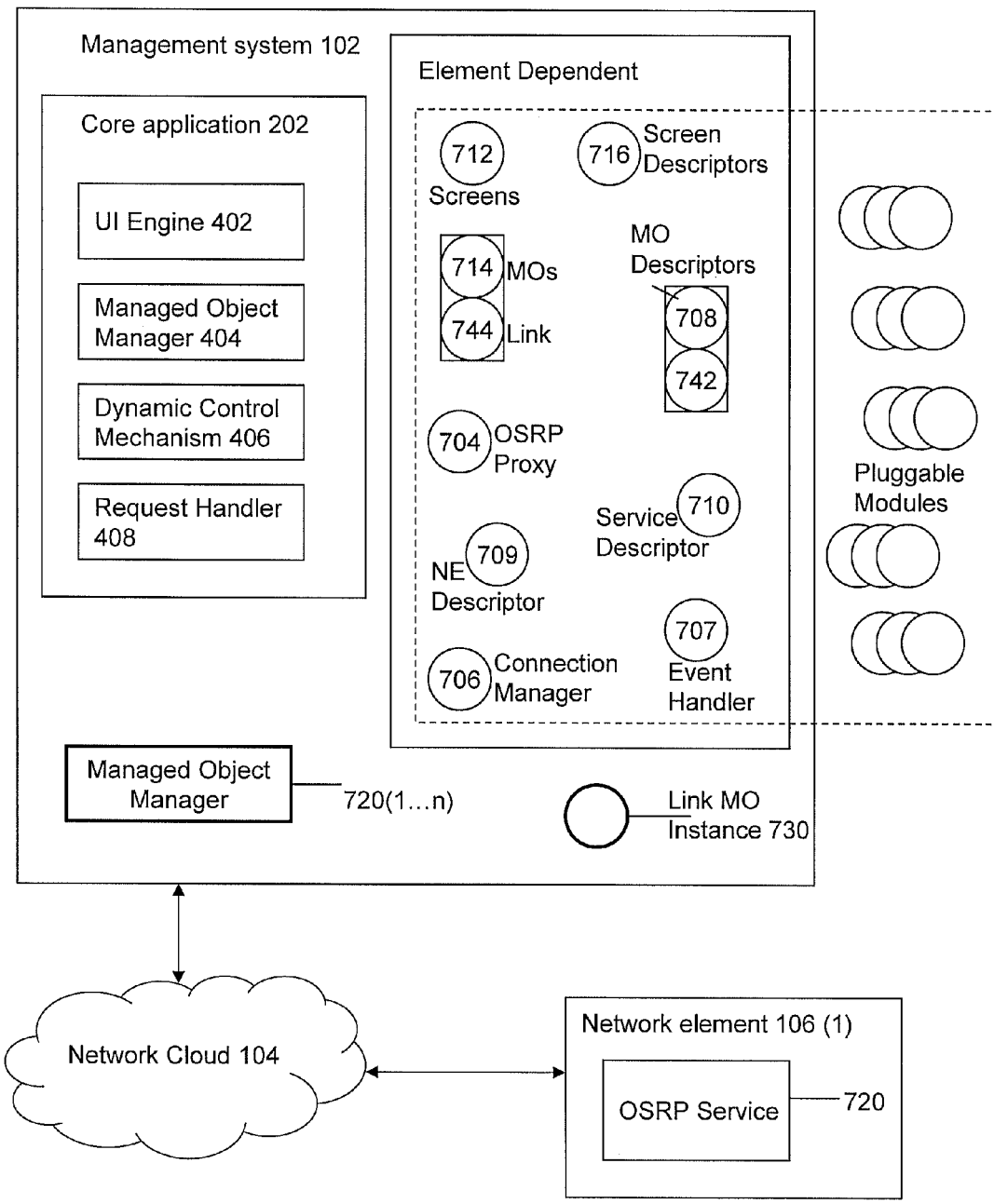
FIG. 7 is a functional diagram of a system comprising a management mechanism that has been dynamically constructed in accordance with one embodiment of the present invention.
Figure 8:
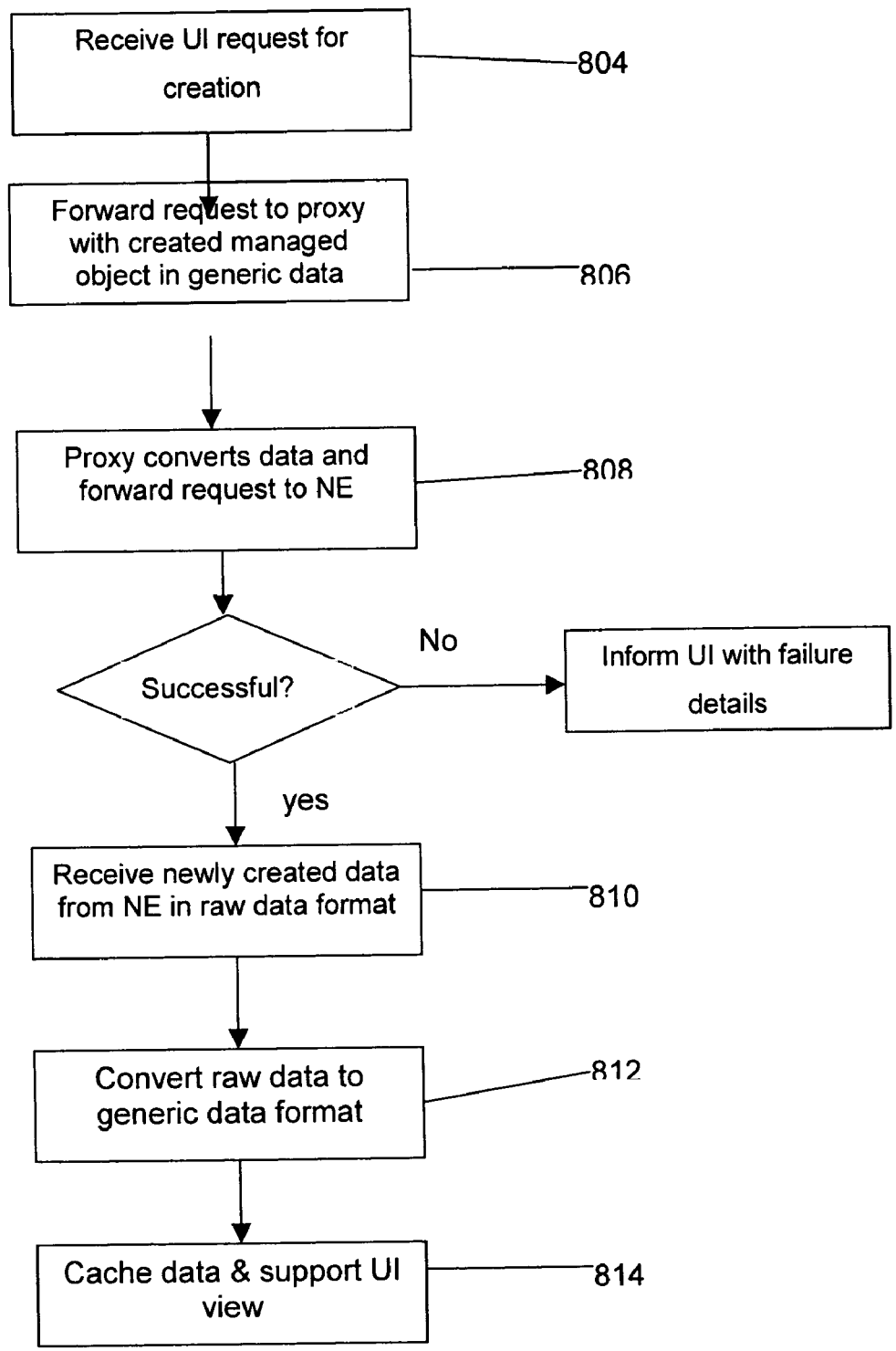
FIG. 8 is an operational flow diagram illustrating details of new managed objects creation process in accordance with one embodiment of the present invention.
Figure 9:
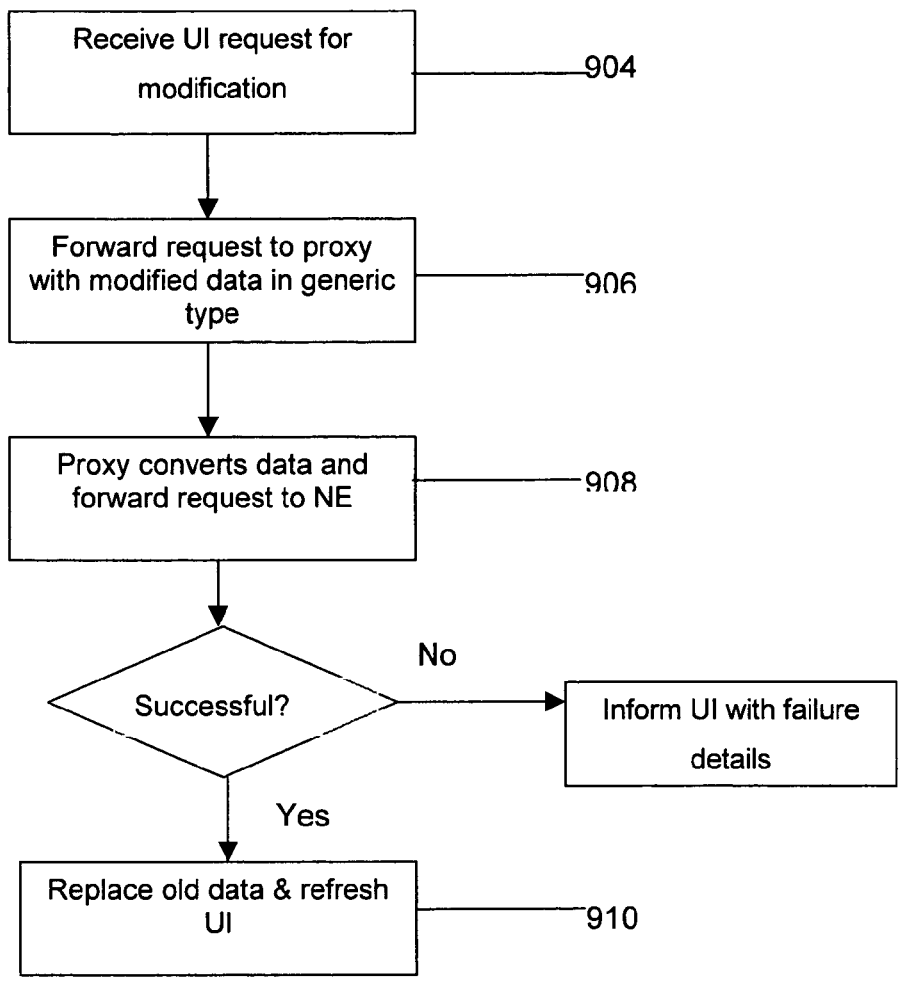
FIG. 9 is an operational flow diagram illustrating details of existing managed objects modification process in accordance with one embodiment of the present invention.

A functional diagram of the management mechanism 102 at this stage is shown in FIG. 7. As shown, the core application 202 comprises the UI engine 402 and two Managed Object Manager instances 702. One instance 702(1) is associated with the Node managed object class, and the other instance 702(2) is associated with the Link managed object class.

The element-dependent modules 204 include the proxy 704 associated with the OSRP service, the connection manager 706 for enabling communication with the OSRP service 720 on the element 106(1), the event Handler 707 if NE support autonomous messaging and other modules 708-716 that have been loaded (Note: Node object instance 730 does not yet exist at this point). The management mechanism 102 is now ready to be used to manage element 106(1).

Figure 6:
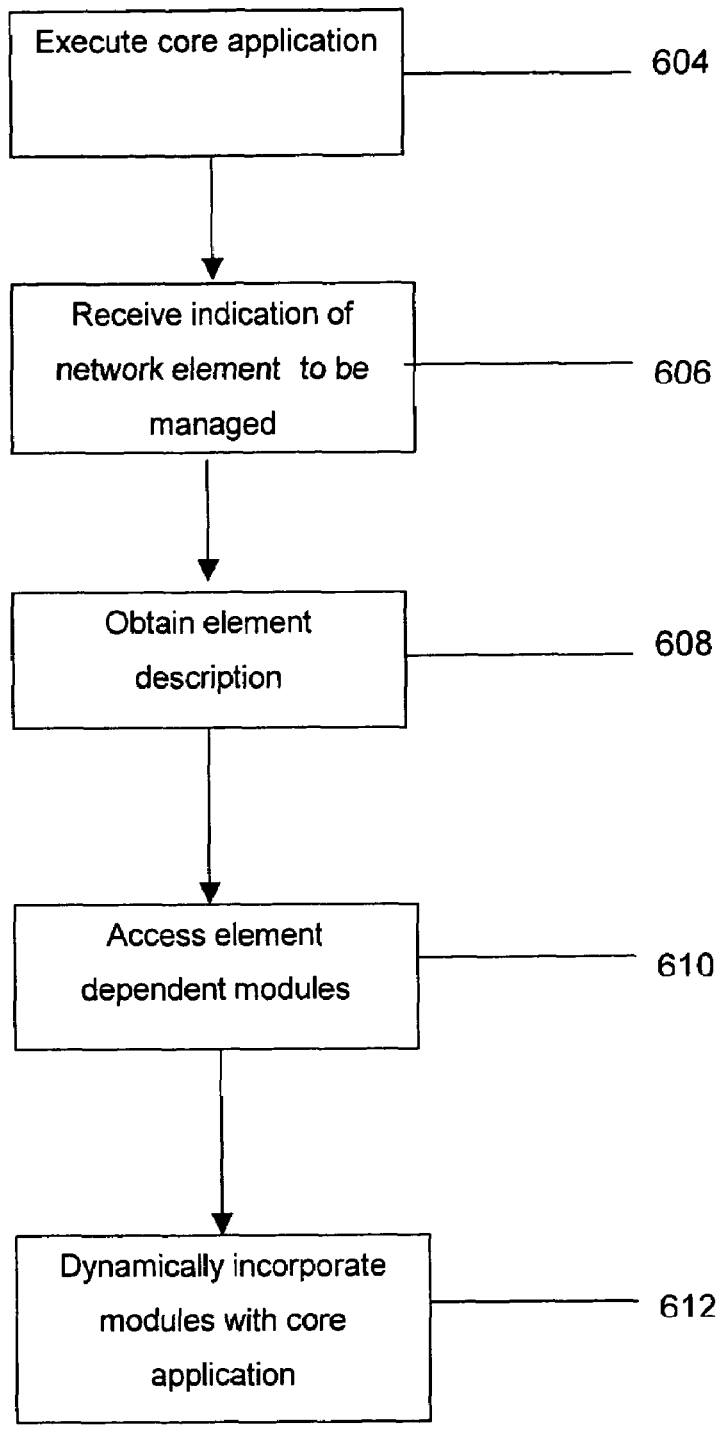
FIG. 6 is an operational flow diagram illustrating the process for dynamically constructing a management system in accordance with one embodiment of the present invention.

In the above discussion, the process shown in FIG. 6 is used to incorporate one set of element-dependent modules 204 with the core application 202. This same process may be repeated to incorporate another set of element-dependent modules 204 with the core application 202 (with the exception that operation (604) need not be carried out again since only one core application execution is needed). Any number of sets of element-dependent modules 204 may be incorporated with the core application 202 using this process. By incorporating multiple sets of element-dependent modules 204 with the core application 202, a management mechanism 202 can be dynamically constructed which is capable of managing a plurality of different network elements 106.

Sample Operation

To illustrate how the various components interact during an operation, a sample operation will now be described. Reference will be made to the functional diagram of FIG. 7.

After a set of element-dependent modules 204 is incorporated with the core application 202, the UI engine 402 of the core application 202 may render one of the screens 712 as an initial "welcome" screen. This screen may show the user the services that are offered, and the type of functionality supported by those services using managed object classes. In this example, there is one service and two managed object classes; thus, the welcome screen may show the OSRP service, and the two screens associated with two managed object classes of Node and Link. In the screen descriptor 716 associated with the welcome screen, the mapping of the screen tab to the appropriate screen is specified. Again for each screen related to each functionality (node or link) there will be a separate screen descriptor which will contain details of attributes providing useful information of a "node" to user as well as UI widget presenting that information. For example, a first "widget" (instructions used to display user interface components on a field) can be mapped to the Node managed object class's location information, and a second widget can be mapped to the Node managed object class's connectivity status with other network elements in the network. Now, suppose the user selects the Link related screen and issues a command to create a new link object instance to add a new link from that node to another node in the network 804. The UI engine 402 receives this command and responds by invoking the createObject method of the ManagedoManager 702(1). Because this is a createObject call, the Managed Object Manager 702(1) knows that the object instance does not yet exist; thus, it does not try to get any data from cache. Instead, Managed Object Manager 702(1) forwards the call 806 to the proxy 704. More specifically, Managed Object Manager 702(1) invokes the createObject method of the proxy 704 to cause the proxy 704 to interact with the OSRP service 720 to create a new link object instance 808.

In response to the createObject method invocation, the proxy 704 executes its implementation of the createObject method. This implementation generates a call to a specific function on the OSRP service 720 that creates new link object instances. The implementation ensures that the call is in the format expected by the OSRP service 720. Thereafter, using the connection obtained from connection manager 706, the proxy 704 sends the call to the OSRP service 720. In response, the OSRP service 720 creates a new Link object instance, and returns it to the proxy 704 in a raw data format used by the OSRP service 720. Information of successful creation of a new Link object can be obtained by the management mechanism in a variety of ways depending up on the type of network element it is dealing at that point in time. Some network element can return the values in the same call as described in the example above while others can send out an autonomous message/notification with an indication of operation's success and management system will have to update it's local cache by polling or NE can send autonomous message/notification with complete copy of newly created Link object instance. The behavior of the target NE will be specified in NE descriptor 709 and based on that information core component will apply appropriate element dependent module and this will make core component still element independent.

Upon receiving the new Link object instance 810 from the OSRP service 720, the proxy 704 instantiates the Link object class 744 in the managed object classes 714 to give rise to a new Link object instance 730. The proxy 704 invokes the init method of this new Link object instance 730 and passes to it the raw object data received from the OSRP service 720. The implementation for the init method transforms the object data in the raw data format into a generic data format that the core application 202 can process 812. The object data is stored in the new Link object instance 730 in the generic data format. The new Link object instance 730 is thus initialized. Thereafter, the proxy 704 returns the new Link object instance 730 to the Managed Object Manager 702(1) for further processing 814.

After getting the newly created Link object instance 730, an indication to user will be given that operation is successful. Once user chooses to see details about the new link, the Managed Object Manager 702(1) gets that data from local cache (which can be in memory cache or a database) and repeatedly invokes the getAttribute method of the Node object instance 730 to get values for each of the attributes. To do this, the Managed Object Manager 702(1) needs to know what attributes are supported by the Link object instance 730. This information is obtained from the managed object descriptor 742 for the Link managed object class. This descriptor 742 specifies the attributes and the types of the attributes that are supported by the Node managed object class.

After obtaining the attribute values, the Managed Object Manager 702(1) returns to the UI engine 402, and provides the attribute values to the engine 402. Thereafter, the UI engine 402 renders a screen 712 that is associated with a Link object instance 730. This screen may have fields for holding attribute values of the Link object instance 730. In rendering this screen, the UI engine 402 will need to put attribute values in the various fields, and in order to do that, the UI engine will use an attribute-to-field mapping. This mapping is specified in the screen descriptor associated with that screen. This mapping, together with the attribute values received from the Managed Object Manager 702(1), enables the UI engine 402 to render the screen. A new Link object instance 730 is thus created and rendered to the user.

Taking an another example of modifying data related to a node. User will first select that node object instance from the screen. Thereafter, the user may change some of the attribute values, and issue a command to modify the Node object instance 730 in accordance with the new attribute values 904. In response to such a command, the UI engine 402 figures out which of many attributes are requested by user for modification and prepares a request and invokes the modifyObject method of the Managed Object Manager 702(1), and provides to the Managed Object Manager 702(1) the modified attributes and it's values. Thereafter, the Managed Object Manager 702(1) invokes the modifyObject method of the proxy 704 to cause the proxy 704 to interact with the OSRP service 720 to modify the link object instance 906 on the element 106(1). In this invocation, the Managed Object Manager 702(1) passes the Node object instance 730 to the proxy 704.

In response to the modifyObject method invocation, the proxy 704 executes its implementation of the modifyObject method. This implementation invokes the convertData method of the ManagedObjectInterface (implemented by Node object instance 730) to cause the attribute values of the Node object instance 730 to be converted from the generic data format to the raw data format expected by the OSRP service 720. In addition, this implementation generates a call to a specific function on the OSRP service 720 that modifies Node objects 908. As part of this call, the attribute values in the raw data format are provided. Using the connection obtained from connection manager 706, the proxy 704 sends the call to the OSRP service 720. In response, the OSRP service 720 modifies the Node object instance in accordance with the new attribute values. Once confirmed by way of notification or the success of the call, Node object instance 730 is updated with the new attribute values in the Node object instance 730 kept in local cache/database 910. In this manner, the Node object instance is updated.

The above discussion shows an example of how the various components may interact to carry out the create and modify functions. The components may interact in a similar fashion to carry out many other functions.

Hardware Overview

As noted previously, in one embodiment, the management mechanism 102 takes the form of a general-purpose computer executing one or more sets of code. FIG. 10 shows a hardware block diagram of a computer system 1000 in which one embodiment of the management mechanism 102 may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 may also be further used to store temporary variables or other intermediate information during execution of instructions by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

According to one embodiment, the functionality of the present invention is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and the like. Non-volatile media includes, for example, optical or magnetic disks, such as storage device 1010. Volatile media includes dynamic memory, such as main memory 1006.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 810 either before or after execution by processor 1004.

Computer system 1000 also includes a communication interface 1018 coupled to bus 1002. Communication interface 1018 provides a two-way data communication coupling to a network link 820 that is connected to a local network 822. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. In this manner, computer system 1000 may obtain application code in the form of a carrier wave.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for dynamically constructing a network element management system, comprising:
   executing a core application, the core application comprising NE element-independent Version Independent functionality that can be invoked to interact with any network element, wherein NE element-independent Version Independent functionality comprises the core application containing no code specific with any network element and code related to general functionality for interaction with any network element;
   receiving an indication of a particular network element to be managed;
   obtaining a description of the particular network element, which specifies one or more characteristics of the particular network element;
   accessing, based upon the description, a set of one or more element-dependent modules, the set of element-dependent modules comprising functionality for invoking one or more management services provided by the particular network element;
   dynamically incorporating at least a portion of the set of element-dependent modules with the core application to derive a management system capable of managing the particular network element; and
   managing the particular network element with the management system with the set of element-dependent modules and the core application, wherein the managing comprises utilizing remove invocation mechanisms comprising one of HTTP, SNMP, TCP/IP, CORBA, RPC, JAVA, and RMI, and wherein the element-dependent modules enable the core application to invoke specific services provided by the particular network element.

2. The method of claim 1, wherein the set of element-dependent modules comprises a first proxy corresponding to a first management service provided by the particular network element, the first proxy comprising functionality for converting a generic service invocation from the core application into a specific invocation of the first management service.

3. The method of claim 2, wherein the first proxy implements a common interface implemented by all proxies, and wherein the core application interacts with the first proxy via the common interface.

4. The method of claim 3, wherein dynamically incorporating the set of element-dependent modules comprises:
   instantiating the first proxy to give rise to a first proxy instance; and
   incorporating the first proxy instance with the core application.

5. The method of claim 3, wherein the first proxy manages one or more managed object classes, and wherein the set of element-dependent modules further comprises the one or more managed object classes.

6. The method of claim 5, wherein dynamically incorporating the set of element-dependent modules comprises:
   loading the one or more managed object classes.

7. The method of claim 5, wherein each managed object class implements a second common interface implemented by all managed object classes.

8. The method of claim 7, where each managed object class comprises functionality for converting a raw data type used by the first management service into a generic data type used by the core application.

9. The method of claim 7, where each managed object class comprises functionality for converting a generic data type used by the core application into a raw data type used by the first management service.

10. The method of claim 1, wherein the set of element-dependent modules comprises a service descriptor which provides a description of at least one particular management service provided by the particular network element, the service descriptor specifying one or more managed object classes managed by the particular management service.

11. The method of claim 10, wherein the set of element-dependent modules comprises a user interface screen associated with a particular managed object class, and wherein the user interface screen comprises fields for rendering data corresponding to attributes of the particular managed object class.

12. The method of claim 11, wherein the set of element-dependent modules further comprises a screen descriptor associated with the user interface screen, the screen descriptor specifying a mapping between the fields of the user interface screen and the attributes of the particular managed object class.

13. The method of claim 1, wherein the characteristics of the particular network element comprise an indication of an element type, and an indication of an element version.

14. The method of claim 1, further comprising:
   receiving an indication of a second network element to be managed;
   obtaining a second description of the second network element, which specifies one or more characteristics of the second network element;
   accessing, based upon the second description, a second set of one or more element-dependent modules, the second set of element-dependent modules comprising functionality for invoking one or more management services provided by the second network element; and
   dynamically incorporating at least a portion of the second set of element-dependent modules with the core application to derive a management mechanism capable of managing both the particular network element and the second network element.

15. A computer readable medium, comprising:
   instructions for causing one or more processors to give rise to a core application, the core application comprising element-independent functionality that can be invoked to interact with any network element and wherein the core application comprises no code specific with any network element and code related to general functionality for interaction with any network element;

instructions for causing one or more processors to receive an indication of a particular network element to be managed;

instructions for causing one or more processors to obtain a description of the particular network element, which specifies one or more characteristics of the particular network element;

instructions for causing one or more processors to access, based upon the description, a set of one or more element-dependent modules, the set of element-dependent modules comprising functionality for invoking one or more management services provided by the particular network element;

instructions for causing one or more processors to dynamically incorporate at least a portion of the set of element-dependent modules with the core application to derive a management mechanism capable of managing the particular network element; and instructions for causing one or more processors to manage the particular network element with the set of element-dependent modules and the core application, wherein to manage the particular network element comprises utilizing remote invocation mechanisms comprising one of HTTP, SNMP, TCP/IP, CORBA, RPC, JAVA, and RMI, and wherein the element-dependent modules enable the core application to invoke specific services provided by the particular network element.

16. The computer readable medium of claim 15, wherein the set of element-dependent modules comprises a first proxy corresponding to a first management service provided by the particular network element, the first proxy comprising functionality for converting a generic service invocation from the core application into a specific invocation of the first management service.

17. The computer readable medium of claim 16, wherein the first proxy implements a common interface implemented by all proxies, and wherein the core application interacts with the first proxy via the common interface.

18. The computer readable medium of claim 17, wherein the instructions for causing one or more processors to dynamically incorporate the set of element-dependent modules comprises:
    instructions for causing one or more processors to instantiate the first proxy to give rise to a first proxy instance; and
    instructions for causing one or more processors to incorporate the first proxy instance with the core application.

19. The computer readable medium of claim 17, wherein the first proxy manages one or more managed object classes, and wherein the set of element-dependent modules further comprises the one or more managed object classes.

20. The computer readable medium of claim 19, wherein the instructions for causing one or more processors to dynamically incorporate the set of element-dependent modules comprises:
    instructions for causing one or more processors to load the one or more managed object classes.

21. The computer readable medium of claim 19, wherein each managed object class implements a second common interface implemented by all managed object classes.

22. The computer readable medium of claim 21, where each managed object class comprises functionality for converting a raw data type used by the first management service into a generic data type used by the core application.

23. The computer readable medium of claim 21, where each managed object class comprises functionality for converting a generic data type used by the core application into a raw data type used by the first management service.

24. The computer readable medium of claim 15, wherein the set of element-dependent modules comprises a service descriptor which provides a description of at least one particular management service provided by the particular network element, the service descriptor specifying one or more managed object classes managed by the particular management service.

25. The computer readable medium of claim 24, wherein the set of element-dependent modules comprises a user interface screen associated with a particular managed object class, and wherein the user interface screen comprises fields for rendering data corresponding to attributes of the particular managed object class.

26. The computer readable medium of claim 25, wherein the set of element-dependent modules further comprises a screen descriptor associated with the user interface screen, the screen descriptor specifying a mapping between the fields of the user interface screen and the attributes of the particular managed object class.

27. The computer readable medium of claim 15, wherein the characteristics of the particular network element comprise an indication of an element type, and an indication of an element version.

28. The computer readable medium of claim 15, further comprising:
    instructions for causing one or more processors to receive an indication of a second network element to be managed;
    instructions for causing one or more processors to obtain a second description of the second network element, which specifies one or more characteristics of the second network element;
    instructions for causing one or more processors to access, based upon the second description, a second set of one or more element-dependent modules, the second set of element-dependent modules comprising functionality for invoking one or more management services provided by the second network element; and
    instructions for causing one or more processors to dynamically incorporate at least a portion of the second set of element-dependent modules with the core application to derive a management mechanism capable of managing both the particular network element and the second network element.

* * * * *